US012800499B2

(12) United States Patent
Chung et al.

(10) Patent No.: US 12,800,499 B2
(45) Date of Patent: Nov. 17, 2026

(54) DEVICE ARRAY ANALYSIS METHOD AND ANALYSIS APPARATUS THEREFOR

(71) Applicant: Dongguk University Industry-Academic Cooperation Foundation, Seoul (KR)

(72) Inventors: Kwunbum Chung, Seoul (KR); Kwangsik Jeong, Wonju-si (KR); Dongjoon Yi, Seoul (KR)

(73) Assignee: Dongguk University Industry-Academic Cooperation Foundation, Seoul (KR)

(*) Notice: Subject to any disclaimer, the term of this patent is extended or adjusted under 35 U.S.C. 154(b) by 143 days.

(21) Appl. No.: 18/771,046

(22) Filed: Jul. 12, 2024

(65) Prior Publication Data

US 2025/0321188 A1 Oct. 16, 2025

(30) Foreign Application Priority Data

Apr. 12, 2024 (KR) ........................ 10-2024-0049532

(51) Int. Cl.

| | |
|---|---|
| ***G01N 21/00*** | (2006.01) |
| ***G01N 21/64*** | (2006.01) |
| ***G01N 21/95*** | (2006.01) |

(52) U.S. Cl.

CPC ..... *G01N 21/6456* (2013.01); *G01N 21/6402* (2013.01); *G01N 21/6489* (2013.01); *G01N 21/9505* (2013.01); *G01N 2201/06113* (2013.01)

(58) Field of Classification Search

CPC ........... G01N 21/6402; G01N 21/6456; G01N 21/6489; G01N 21/8851; G01N 21/9505; G01N 2201/06113

See application file for complete search history.

(56) References Cited

U.S. PATENT DOCUMENTS

| | | | | |
|---|---|---|---|---|
| 10,012,544 | B2 | 7/2018 | Zhao et al. | |
| 2002/0094528 | A1 | 7/2002 | Salafsky | |
| 2006/0044641 | A1 | 3/2006 | Alles et al. | |
| 2015/0330909 | A1* | 11/2015 | Koldiaev | G01R 29/24 356/237.2 |
| 2019/0107495 | A1 | 4/2019 | Shafiei et al. | |
| 2020/0088649 | A1 | 3/2020 | Jeang et al. | |
| 2020/0408699 | A1 | 12/2020 | Koldiaev et al. | |
| 2022/0068681 | A1 | 3/2022 | Han et al. | |
| 2022/0163386 | A1 | 5/2022 | Lin et al. | |

FOREIGN PATENT DOCUMENTS

| | | | |
|---|---|---|---|
| JP | 2004-521323 | A | 7/2004 |
| KR | 10-2019-0082883 | A | 7/2019 |
| KR | 10-2023-0144174 | A | 10/2023 |
| KR | 10-2024-0007383 | A | 1/2024 |
| WO | 2023/195717 | A1 | 10/2023 |

* cited by examiner

*Primary Examiner* — Dani Fox

(74) *Attorney, Agent, or Firm* — Sughrue Mion, PLLC

(57) ABSTRACT

A device array analysis method includes manufacturing a device array including one or more devices, supplying a first light signal to the device array, obtaining an image by detecting a second light signal emitted from the device array, and analyzing the image to determine whether the device array is normal or defective.

20 Claims, 16 Drawing Sheets

FIG. 9

| | | | | | | | | | |
|---|---|---|---|---|---|---|---|---|---|
| -22.7 | -22.2 | -18.3 | -12.7 | -10.9 | -2.3 | -0.8 | -0.1 | -1.3 | -0.1 |
| -27.9 | -22.3 | -20.9 | -11.8 | -10.7 | -3.5 | -0.1 | -2.5 | -1.3 | -3.7 |
| -23.0 | -21.2 | -22.6 | -12.4 | -10.7 | -3.3 | -0.2 | -0.4 | -3.5 | -0.4 |
| -21.7 | -2.4 | -23.4 | -13.9 | -10.1 | -0.4 | -2.2 | -0.5 | -1.2 | 0.0 |
| -12.2 | -3.9 | -3.6 | 0.0 | -3.6 | -2.6 | -3.1 | 0.0 | -2.3 | -0.8 |
| -3.0 | -12.8 | -6.3 | -0.2 | -0.5 | -2.3 | -2.9 | -3.5 | -6.2 | -2.5 |
| -15.6 | -20.9 | -11.8 | -12.9 | -0.5 | -0.2 | -7.0 | -5.7 | -6.5 | -3.7 |
| -22.0 | -22.5 | -13.8 | -16.9 | -2.3 | -3.8 | -5.3 | -11.1 | -6.7 | -7.3 |
| -25.9 | -28.1 | -23.5 | -24.5 | -2.2 | -0.8 | -15.1 | -17.7 | -19.3 | -10.8 |
| -29.3 | -28.9 | -28.0 | -21.3 | -3.8 | -2.5 | -13.5 | -14.4 | -19.4 | -10.9 |

FIG. 10

| | | | | | | | | | |
|---|---|---|---|---|---|---|---|---|---|
| 17330 | 16762 | 15266 | 14610 | 14204 | 12002 | 12009 | 11605 | 11864 | 11909 |
| 18718 | 17032 | 16625 | 14150 | 14043 | 12512 | 11552 | 12039 | 11833 | 12561 |
| 17982 | 16759 | 17935 | 1449 | 14103 | 12396 | 11789 | 11939 | 12464 | 11590 |
| 16793 | 11910 | 18019 | 14716 | 13930 | 11640 | 12310 | 11554 | 11810 | 12133 |
| 13667 | 12043 | 12545 | 12075 | 12195 | 12085 | 11730 | 12145 | 11904 | 11810 |
| 11753 | 14540 | 12436 | 12204 | 11509 | 12314 | 11705 | 12407 | 12991 | 12055 |
| 15824 | 16317 | 13587 | 14521 | 11355 | 11866 | 13200 | 13306 | 13488 | 12078 |
| 16683 | 16821 | 14704 | 15252 | 12229 | 12593 | 13237 | 14229 | 13186 | 13212 |
| 18442 | 18527 | 17076 | 18052 | 11883 | 11420 | 15811 | 15281 | 16297 | 14143 |
| 17777 | 18750 | 18460 | 16762 | 12554 | 12016 | 14434 | 14516 | 16374 | 14115 |

DEVICE ARRAY ANALYSIS METHOD AND ANALYSIS APPARATUS THEREFOR

CROSS-REFERENCE TO RELATED APPLICATION

This application is based on and claims priority under 35 U.S.C. § 119 to Korean Patent Application No. 10-2024-0049532, filed on Apr. 12, 2024, in the Korean Intellectual Property Office, the disclosure of which is incorporated by reference herein in its entirety.

BACKGROUND

1. Field

The disclosure relates to a device array analysis method and an analysis apparatus therefor. More particularly, the disclosure relates to a device array analysis method using a non-linear light signal and an analysis apparatus therefor.

2. Description of the Related Art

In non-linear optics, light beam input(s) are output as the sum, difference, or harmonic frequencies of the light beam input(s). Second harmonic generation (SHG) is a non-linear effect in which light with twice the frequency of an incident light beam is emitted. This process may be considered a combination of two photons of energy E to produce a single photon 2E of incident radiation (i.e., to produce light with twice (2ω) the frequency or half the wavelength). Such an effect may be generalized to photon combinations of different energies corresponding to different frequencies.

Without being bound by any particular theory, an SHG process does not occur within or in the bulk of materials that exhibit the center of symmetry (i.e., inversion or centrosymmetric materials), including amorphous materials. In the case of such materials, an SHG process may be detected only on surfaces and/or interfaces where the inversion symmetry of the bulk of the materials is broken. Therefore, the SHG process sensitively provides information about surface and interface characteristics.

SUMMARY

Provided are a quick and accurate device array analysis method and an analysis apparatus therefor.

In addition, the technical objectives to be achieved by the disclosure are not limited to the above objective, and other objectives that are not mentioned herein will be clearly understood from the following description by those of ordinary skill in the art.

Additional aspects will be set forth in part in the description which follows and, in part, will be apparent from the description, or may be learned by practice of the presented embodiments of the disclosure.

According to an aspect of the disclosure, a device array analysis method includes manufacturing a device array including one or more devices, supplying a first light signal to the device array, obtaining an image by detecting a second light signal emitted from the device array, and analyzing the image to determine whether the device array is normal or defective.

The device array analysis method may further include removing interference between different second light signals emitted from the device array.

The analyzing of the image to determine whether the device array is normal or defective may include calculating at least one of a threshold voltage of the one or more devices and a defect density of the device array, based on intensity of the second light signal of the image.

The obtaining of the image may include obtaining an image of each of a plurality of devices of the device array, and/or obtaining an image of a device located at a specific position in the device array.

The determining of whether the device array is normal or defective may include, when the device array includes only normal devices, proceeding to an end operation, and when the device array includes defective devices, modifying a manufacturing process condition of the device array.

The obtaining of the image may include executing an algorithm for combining spot spectra of the device array; and/or obtaining an image for each region in the device array.

A frequency of the second light signal may be twice a frequency of the first light signal.

The one or more devices may include at least one of a semiconductor device and a display device.

According to another aspect of the disclosure, a device array analysis method includes manufacturing a device array including one or more devices, supplying a first light signal to the device array, obtaining an image by detecting a second light signal emitted from the device array, analyzing the image to determine whether the device array is normal or defective, and when it is determined that the device array is defective, performing a subsequent process on the defective device array.

The performing of the subsequent process on the defective device array may include searching for the defective device array, moving a stage, adjusting intensity of a third light signal supplied to the defective device array, and determining whether the defective device array is normal or defective.

The adjusting of the intensity of the third light signal may be performed based on at least one of a number of defective devices included in the defective device array, a threshold voltage of a defective device, and a defect density of the defective device array.

The determining of whether the defective device array is normal or defective may include, when the defective device array includes only normal devices, proceeding to an end operation, and when the defective device array includes a defective device, proceeding to the adjusting of the intensity of the third light signal.

The third light signal may be incident on a normal device and a defective device.

The third light signal may be incident on a defective device.

According to another aspect of the disclosure, a device array analysis apparatus includes a light source configured to generate and emit a first light signal, a sampler configured to receive the first light signal and emit a second light signal, a detector configured to detect and image the second light signal to form an image, and an analyzer configured to analyze the image, wherein the image includes information about the second light signal emitted from a device array including one or more devices.

The device array analysis apparatus may further include a beam shaper configured to shape the first light signal to have a constant intensity according to space.

The device array analysis apparatus may further include a first beam expander configured to adjust a diameter of the first light signal.

The device array analysis apparatus may further include an optical filter configured to remove signals of different wavelengths included in the first light signal.

The device array analysis apparatus may further include a healer configured to heal the device array which is defective and make a third light signal be incident on the defective device array.

The device array analysis apparatus may further include a second beam expander configured to adjust a diameter of the third light signal.

The device array analysis apparatus may further include an interference remover configured to remove interference between different second light signals emitted from the device array.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 9 is a diagram illustrating threshold voltages in regions of a substrate, according to an embodiment;

FIG. 10 is a diagram illustrating intensity of a second light signal in regions of a substrate, according to an embodiment;

DETAILED DESCRIPTION

Figure 1:
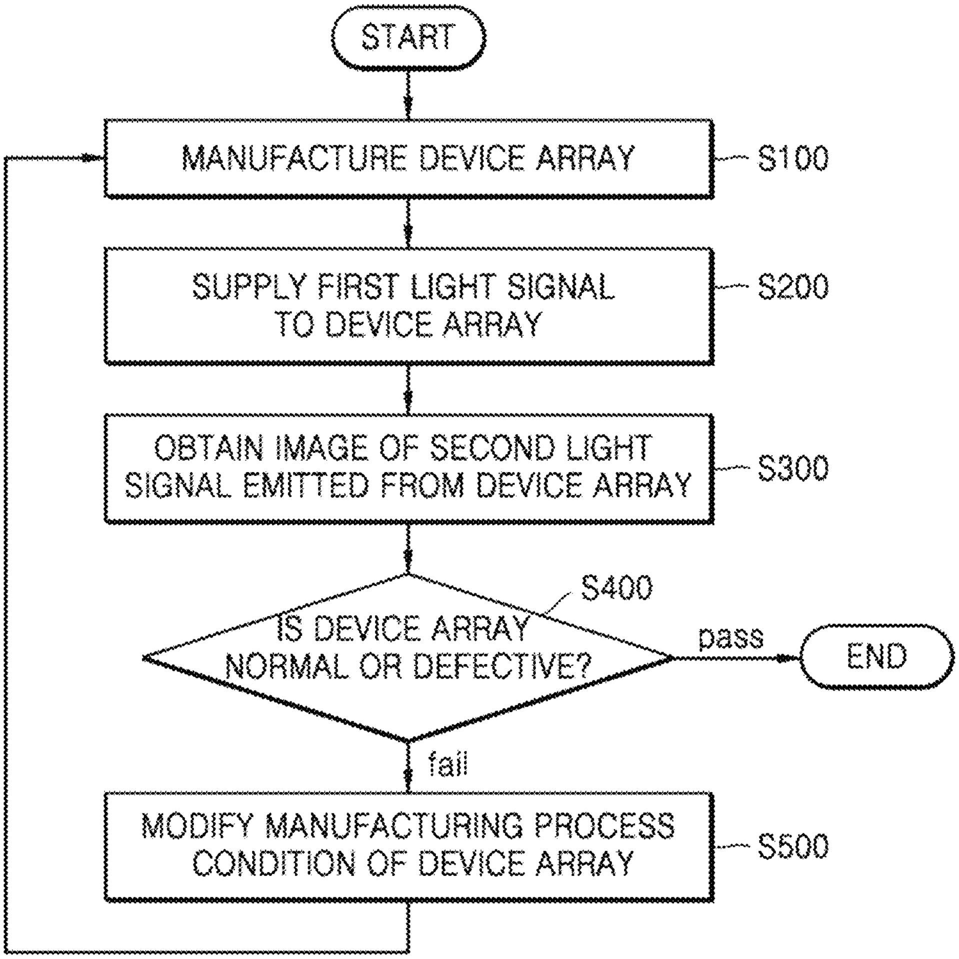
FIG. 1 is a flowchart of a device array analysis method according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, embodiments will be described in detail with reference to the accompanying drawings. The same elements in the drawings are denoted by the same reference numerals, and redundant descriptions thereof are omitted. In the accompanying drawings, the thickness and size of each layer are exaggerated for convenience and clarity of explanation, and thus, may be slightly different from the actual shape and proportion thereof.

The singular forms as used herein are intended to include the plural forms as well unless the context clearly indicates otherwise. It will be understood that the terms "comprise," "include," or "have" as used herein specify the presence of the stated elements, steps, operations, and/or devices, but do not preclude the presence or addition of one or more other elements, steps, operations, and/or devices.

Although terms such as "first" or "second" are used herein to describe various areas, directions, and shapes, these areas, directions, and shapes should not be limited by these terms. These terms are only used to distinguish one area, direction, or shape from another area, direction, or shape. Accordingly, a portion referred to as a first portion in an embodiment may be referred to as a second portion in another embodiment. Embodiments described and illustrated herein also include complementary embodiments thereof. Portions that are denoted by the same reference numerals throughout the specification represent the same elements.

When an element is referred to as being provided "on" another element, it may be understood that the element is provided directly on (i.e., in direct contact with) the other component, or a third element intervenes therebetween.

FIG. 1 is a flowchart of a device array analysis method according to an embodiment.

Referring to FIG. 1, the device array analysis method of the disclosure may include manufacturing a device array (S100), supplying a first light signal to the device array (S200), obtaining an image by detecting a second light signal emitted from the device array (S300), and analyzing the image to determine whether each of one or more devices included in the device array is normal or defective (S400). When the device array includes only normal devices (pass), the process may proceed to an end operation, and when the device array includes defective devices (fail), the process may proceed to operation S500. The device array may include one or more devices.

The obtaining of the image by detecting the second light signal emitted from the device array (S300) may include detecting the second light signal generated by the device array and removing interference between the second light signals emitted from the one or more devices. For example, the obtaining of the image by detecting the second light signal (S300) may include detecting a second light signal spectrum.

In an embodiment, the device array analysis method of the disclosure may further include, after obtaining the image by detecting the second light signal (S300), storing the image and/or information about the image in a database. In an embodiment, the analyzing of the image may include analyzing the image based on information prestored in the database.

In addition, in an embodiment, the device array analysis method of the disclosure may include, after obtaining the image by detecting the second light signal (S300), analyzing the image by correcting a difference depending on a position of the first light signal of an image obtained based on distribution information of the first light signal prestored in the database.

The device array analysis method of the disclosure may further include modifying a device array manufacturing process when the device array includes defective devices (S500). The modifying of the device array manufacturing process (S500) may include modifying at least one of a material composition, an oxygen partial pressure, a plasma power, a pressure, a heat treatment atmosphere, and a heat treatment temperature during the device array manufacturing process.

After the modifying of the device array manufacturing process is performed, the process including the manufacturing of the device array (S100), the supplying of the first light signal to the device array (S200), the obtaining of the image by detecting the second light signal emitted from the device array (S300), and the analyzing of the image to determine whether each of the one or more devices included in the device array is normal or defective (S400) may be repeatedly performed. The process may be performed until the device array includes only normal devices.

Figure 2:
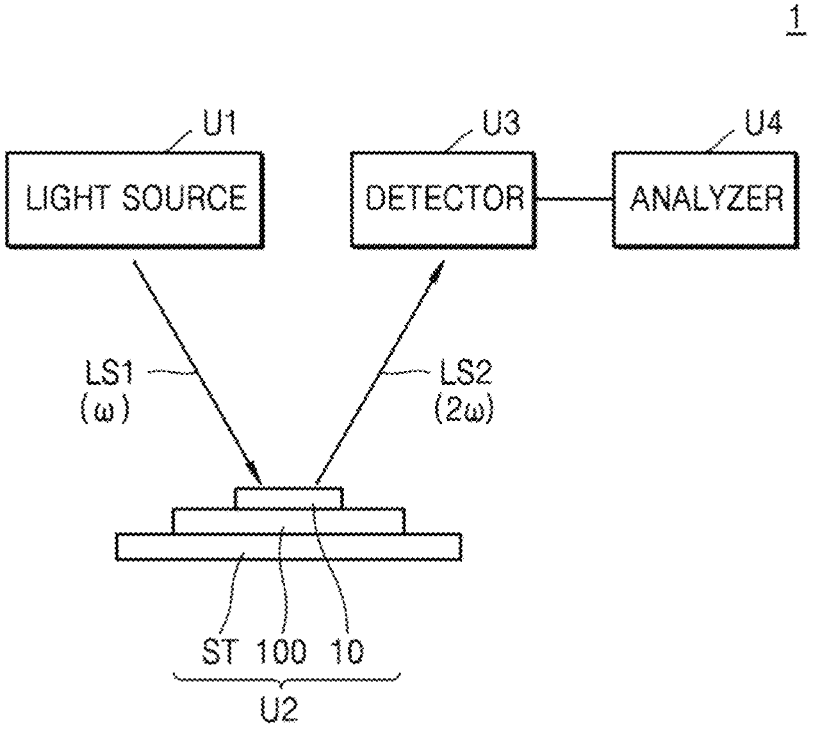
FIG. 2 is a schematic diagram illustrating an analysis apparatus for device array analysis, according to an embodiment.

FIG. 2 is a schematic diagram illustrating an analysis apparatus for device array analysis, according to an embodiment.

Referring to FIG. 2, an analysis apparatus 1 according to the disclosure may include a light source U1, a sampler U2, a detector U3, and an analyzer U4.

The light source U1 may be configured to emit a first light signal LS1. The light source U1 may include a first laser light source, and the first laser light source may be a femtosecond (fs)-laser.

The sampler U2 may be configured to receive the first light signal LS1 and emit a second light signal LS2. A frequency 2ω of the second light signal LS2 may be twice a frequency ω of the first light signal LS1. That is, the second light signal LS2 may be a second harmonic generation (SHG) signal for the first light signal LS1.

The sampler U2 may be configured such that one or more devices 10 are arranged on a substrate 100. The sampler U2 may include a stage ST configured to move the substrate 100 in a horizontal direction (an X direction and/or a Y direction) and/or a vertical direction (a Z direction). The sampler U2 may further include a polarizer and at least one optical element arranged between the light source U1 and the stage ST. The optical element may be, for example, one of a bandpass filter, a short pass filter, and a dichromatic mirror. In another embodiment, the polarizer and the at least one optical element may be included in a transmitter that transmits the first light signal LS1 of the light source U1 to the sampler U2.

In the present specification, a direction parallel to a main surface of the substrate 100 may be defined as the horizontal direction (the X direction and/or the Y direction), and a direction perpendicular to the horizontal direction (the X direction and/or the Y direction) may be defined as the vertical direction (the Z direction).

In addition, the sampler U2 may further include at least one optical element arranged between the stage ST and the detector U3. The optical element may be, for example, one of a bandpass filter, a short pass filter, a dichromatic mirror, a diffraction grating, and a spatial filter.

Each of the one or more devices 10 in a device array to be analyzed by the analysis apparatus 1 according to the disclosure may be a transistor device including an oxide semiconductor material, a thin-film structure including an oxide semiconductor thin-film, and/or a display device, but the disclosure is not limited thereto.

The detector U3 may be configured to detect the second light signal LS2 and may be configured to obtain an image based on the detected second light signal LS2. For example, the detector U3 may include a complementary metal oxide semiconductor (CMOS) image sensor. For example, the detector U3 may include a charge-coupled device (CCD) image sensor.

The detector U3 may obtain an image of each of a plurality of unit devices in the device array. In addition, the detector U3 may obtain an image of a unit device located at a specific position in the device array.

In an embodiment, the detector U3 may obtain the image of the device array by using an algorithm for combining spot spectra. In another embodiment, the detector U3 may directly obtain an image of each region in the device array.

The analyzer U4 may be configured to analyze the image obtained by the detector U3. The analyzer U4 may calculate the threshold voltage of each of the one or more devices 10 and/or the defect density of the device array, based on the image obtained by the detector U3. In an embodiment, the analyzer U4 may calculate the threshold voltage of each of the one or more devices 10 and/or the defect density of the device array, based on the intensity of the second light signal. The analyzer U4 may be configured to determine whether each of the one or more devices 10 included in the device array is normal or defective. According to embodiments, the analyzer U4 may further include a control module that modifies a manufacturing process condition of the device array.

In addition, when calculating the threshold voltage of each device and/or the defect density of the device array, based on the intensity of the second light signal, the analyzer U4 may analyze the image by performing correction thereon based on distribution information of the first light signal prestored in the database.

Figure 3:
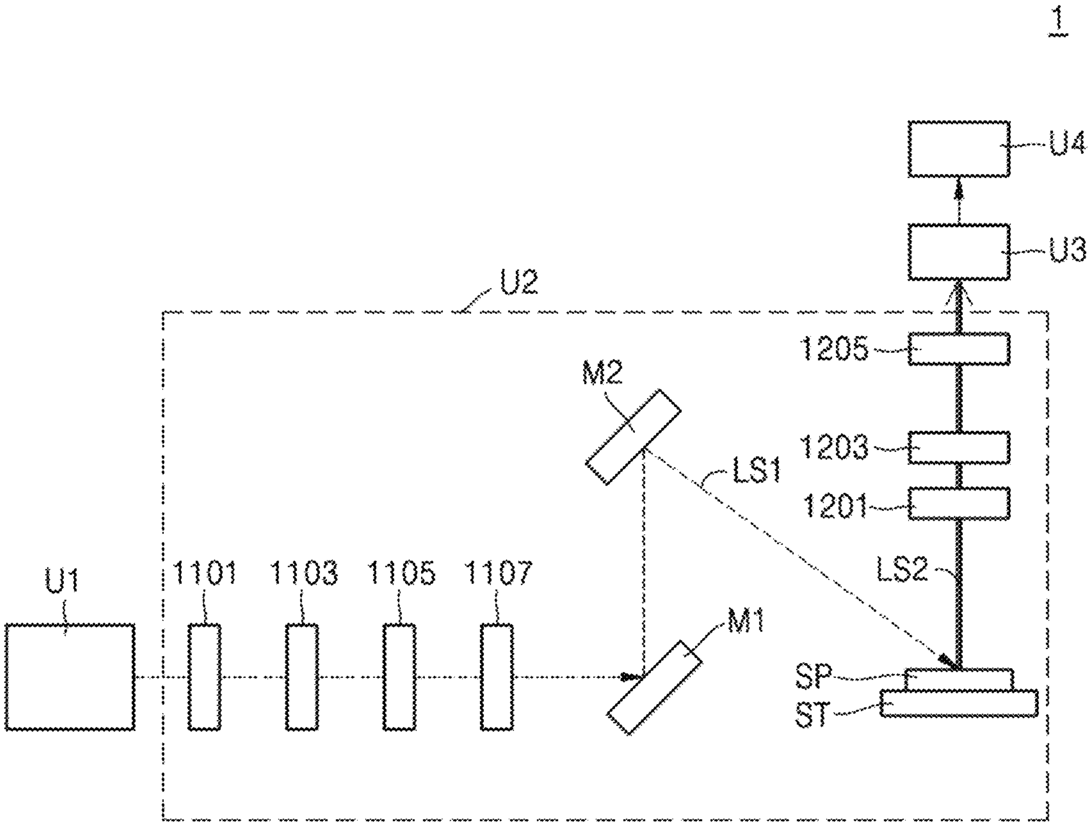
FIG. 3 is a schematic diagram illustrating an analysis apparatus for device array analysis, according to an embodiment.

FIG. 3 is a schematic diagram illustrating an analysis apparatus for device array analysis, according to an embodiment. The following description is given with reference to FIG. 2.

Referring to FIG. 2, an analysis apparatus 1 may include a light source U1, a sampler U2, a detector U3, and an analyzer U4. The sampler U2 may be provided between the light source U1 and the detector U3. The sampler U2 may include a first bandpass filter 1101, a polarizer 1103, a beam shaper 1105, and a first beam expander 1107, which are located on a path that connects the light source U1 to the stage ST.

A first light signal LS1 that is generated and emitted from the light source U1 may pass through the first bandpass filter 1101, the polarizer 1103, the beam shaper 1105, and the first beam expander 1107 and may travel toward the detector U3. The first light signal LS1 may be incident on the device array to generate an SHG signal.

The first bandpass filter 1101 may block pieces of light with other frequencies such that only light with a specific frequency is selectively incident on the one or more devices 10. In an embodiment, at least one optical element, such as a short pass filter or a dichromatic mirror, may be provided instead of the first bandpass filter 1101. The polarizer 1103 may circularly polarize and/or linearly polarize the first light signal LS1. The polarization of the polarizer 1103 may be determined based on a sample measurement process and/or a state of a sample.

The beam shaper 1105 may shape the first light signal LS1. In an embodiment, the beam shaper 1105 may shape the first light signal LS1 having a Gaussian peak shape to have a constant intensity according to space. The beam shaper 1105 shapes the first light signal LS1, such that the deviation in the intensity of the first light signal LS1 incident on each of the one or more devices 10 in the device array may be reduced. For example, the beam shaper 1105 may include a micro lens array and/or a diffractive optical element.

In addition, the first beam expander 1107 may adjust the diameter of the first light signal LS1. For example, the first beam expander 1107 may reduce and/or expand the diameter of the first light signal LS1. The first light signal LS1 that has passed through the beam shaper 1105 and the first beam expander 1107 may be incident on the one or more devices 10.

The sampler U2 may further include a plurality of mirrors located on a path that connects the light source U1 to the stage ST. For example, the sampler U2 may include a first mirror M1 and a second mirror M2. The first mirror M1 and the second mirror M2 may adjust an angle of incidence of the first light signal LS1 incident on the device array. In addition, the first mirror M1 and the second mirror M2 may be configured to maintain the pulse width of the first light signal LS1. For example, the first mirror M1 and the second mirror M2 may each include an ultrafast mirror.

In addition, the sampler U2 may include a second bandpass filter 1201 and a lens 1203, which are located on a path that connects the detector U3 to the stage ST.

The second bandpass filter 1201 may block pieces of light with other frequencies such that only light with a specific frequency is selectively incident on the detector U3. In an embodiment, optical elements, such as a short pass filter, a dichromatic mirror, and a diffraction grating, may be provided instead of the second bandpass filter 1201.

In an embodiment, the second bandpass filter 1201 may be configured such that the second light signal LS2 having twice the frequency of the first light signal LS1 is incident on the detector U3. That is, the second light signal LS2 may be an SHG light for the first light signal LS1. The lens 1203 may be configured to change the magnification and/or resolution of a specific region of the substrate 100.

In addition, the sampler U2 may be located on a path that connects the detector U3 to the stage ST and may further include optical elements configured to remove interference between different second light signals LS2 generated by the devices 10 in the device array. For example, the optical element may include a polarizer, a diffraction grating, a spatial filter, and/or a signal processor. The signal processor may be configured to distinguish between interfered light and non-interfered light. The optical element may be referred to as an interference remover 1205.

In FIGS. 2 and 3, the sampler U2 has been described as including the first bandpass filter 1101, the polarizer 1103, the beam shaper 1105, the first beam expander 1107, the first mirror M1, the second mirror M2, the second bandpass filter 1201, the lens 1203, and the interference remover 1205, but this is a formal distinction for convenience of explanation, and at least one of the first bandpass filter 1101, the polarizer 1103, the beam shaper 1105, the first beam expander 1107, the second bandpass filter 1201, the lens 1203, and the interference remover 1205 may be included in the light source U1, the detector U3, and/or the analyzer U4.

Figure 4:
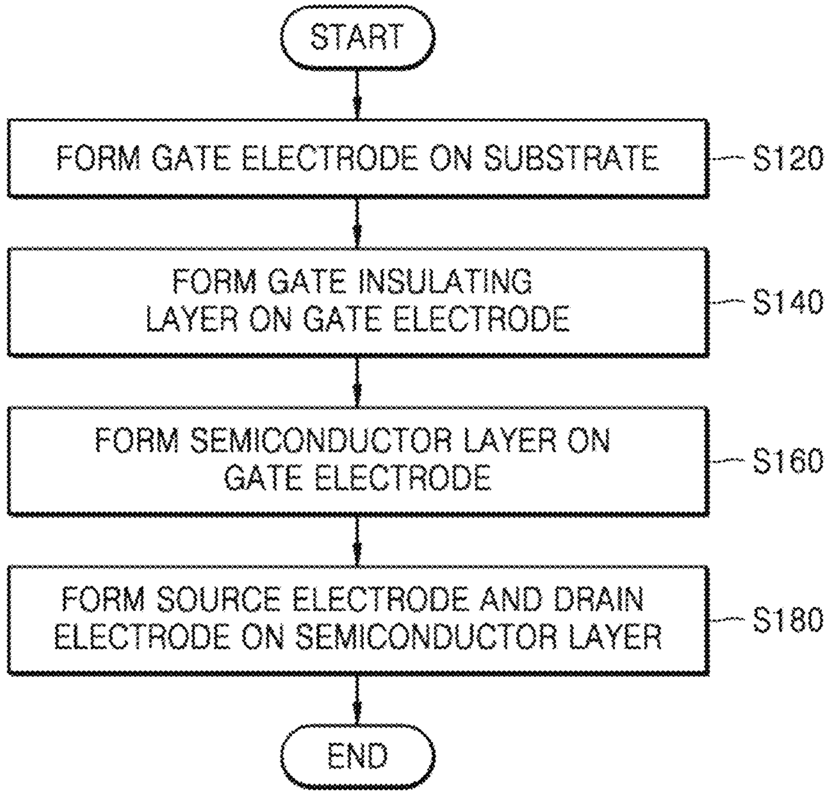
FIG. 4 is a flowchart of a method of manufacturing a device array, according to an embodiment.
Figure 5:
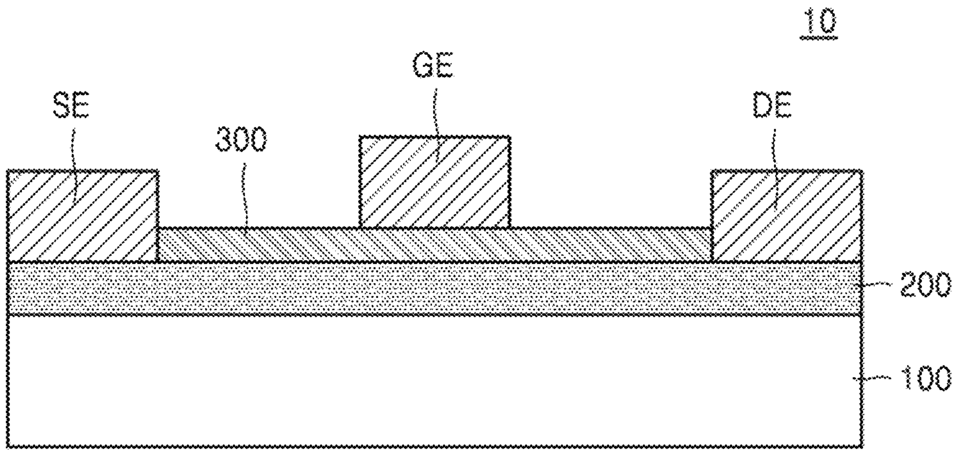
FIGS. 5 to 7 are cross-sectional views illustrating a device according to an embodiment.
Figure 6:
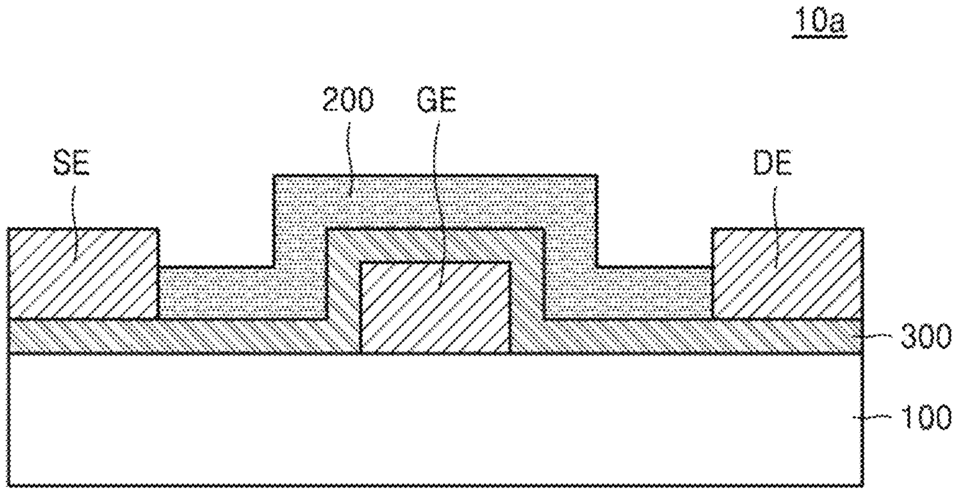
Figure 7:
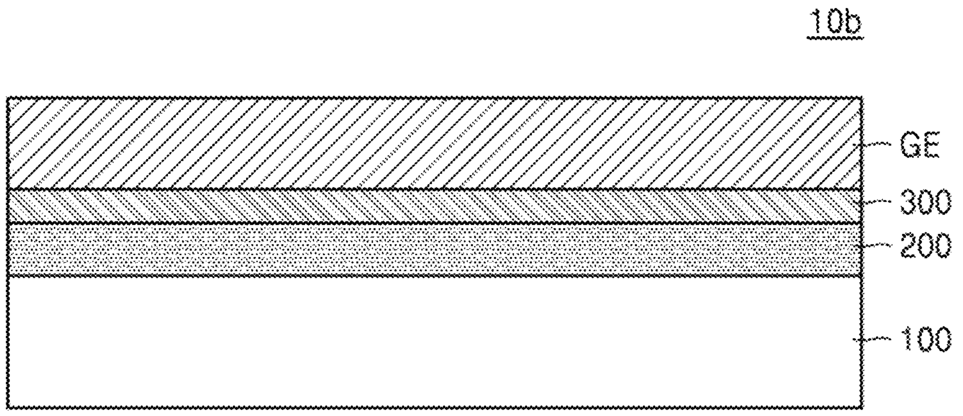

FIG. 4 is a flowchart of a method of manufacturing a device array, according to an embodiment. FIGS. 5 to 7 are cross-sectional views illustrating a device according to an embodiment. The following description is given with reference to FIGS. 1 and 2 together.

Referring to FIGS. 4 to 7, a method of manufacturing a device array may include forming a gate electrode GE on a substrate 100 (S110), forming a gate insulating layer 300 on the gate electrode GE (S120), forming a semiconductor layer 200 on the gate insulating layer 300 (S130), and forming a source electrode SE and a drain electrode DE on the semiconductor layer 200 (S140). However, the formation order of the semiconductor layer 200, the gate insulating layer 300, the gate electrode GE, and the source/drain electrodes SE and DE may be variously modified. The device array may include one or more devices 10.

In an embodiment, the method of manufacturing the device 10 may further include forming a passivation layer on the semiconductor layer 200 and performing a heat treatment process on the device 10. The passivation layer may cover the top surfaces of the source/drain electrodes SE and DE or the gate electrode GE.

The substrate 100 on which the device 10 is arranged may include a semiconductor substrate including at least one of silicon, germanium, and silicon-germanium, a compound semiconductor substrate, a glass substrate, or a plastic substrate. For example, the substrate 100 may include a silicon wafer. According to embodiments, the device 10 may be formed within a front-end-of-line (FEOL) layer, a back-end-of-line (BEOL) layer, or a peripheral circuit structure on substrate 100.

For example, the semiconductor layer 200 may include an oxide semiconductor layer, a semiconductor material including silicon, and/or a two-dimensional (2D) material.

The semiconductor layer 200 may include, for example, a compound of oxygen (O) and at least two elements selected from hydrogen (H), zinc (Zn), indium (In), gallium (Ga), tin (Sn), tantalum (Ta), strontium (Sr), titanium (Ti), copper (Cu), rhodium (Rh), and aluminum (Al). The gate insulating layer 300 may include, for example, at least one of silicon oxide, silicon nitride, silicon oxynitride, and a high-k material. The high-k material may be a material with a higher dielectric constant than silicon oxide and silicon nitride, such as hafnium oxide, aluminum oxide, or tantalum oxide. Each of the gate electrode GE and the source/drain electrodes SE and DE may include, for example, at least one of a doped semiconductor material (doped silicon, doped germanium, etc.), a conductive metal nitride (titanium nitride, tantalum nitride, tungsten nitride, etc.), and a metal material (titanium, tantalum, tungsten, copper, aluminum, ruthenium, molybdenum, etc.).

The device 10 of FIG. 5 may include the semiconductor layer 200, the gate insulating layer 300, the gate electrode GE, and the source/drain electrodes SE and DE, which are sequentially stacked on the substrate 100 in this stated order. The semiconductor layer 200 may be formed between the gate electrode GE and the substrate 100. In other words, the device 10 of FIG. 5 may be a transistor with a top-gate structure. In an embodiment, the source/drain electrodes SE and DE may be provided between the substrate 100 and the semiconductor layer 200. According to another embodiment, the source/drain electrodes SE and DE may be provided between the semiconductor layer 200 and the gate insulating layer 300.

A device 10*a* of FIG. 6 may include a gate electrode GE on a substrate 100, a gate insulating layer 300 covering the gate electrode GE and the substrate 100, a semiconductor layer 200 on the gate insulating layer 300, and source/drain electrodes SE and DE on the gate insulating layer 300. The gate electrode GE may be formed between the semiconductor layer 200 and the substrate 100. In other words, the device 10*a* of FIG. 6 may be a transistor with a bottom-gate structure. In an embodiment, the source/drain electrodes SE and DE may be provided on the top surface of the semiconductor layer 200. According to another embodiment, the source/drain electrodes SE and DE may be provided between the gate insulating layer 300 and the semiconductor layer 200.

A device 10*b* of FIG. 7 may include a semiconductor layer 200, a gate insulating layer 300, a gate electrode GE, which are sequentially stacked on a substrate 100 in this stated order. Each of the semiconductor layer 200, the gate insulating layer 300, and the gate electrode GE on the substrate 100 may be formed in the form of a thin-film.

When the first light signal LS1 is supplied to the devices 10, 10*a*, and 10*b*, the second light signal LS2 may be generated by an electric field at an interface between the gate insulating layer 300 and the semiconductor layer 200. At this time, the second light signal LS2 may be a non-linear signal having an energy that is an integer multiple of an initial photon generated by the electric field at the interface between the gate insulating layer 300 and the semiconductor layer 200.

Figure 8:
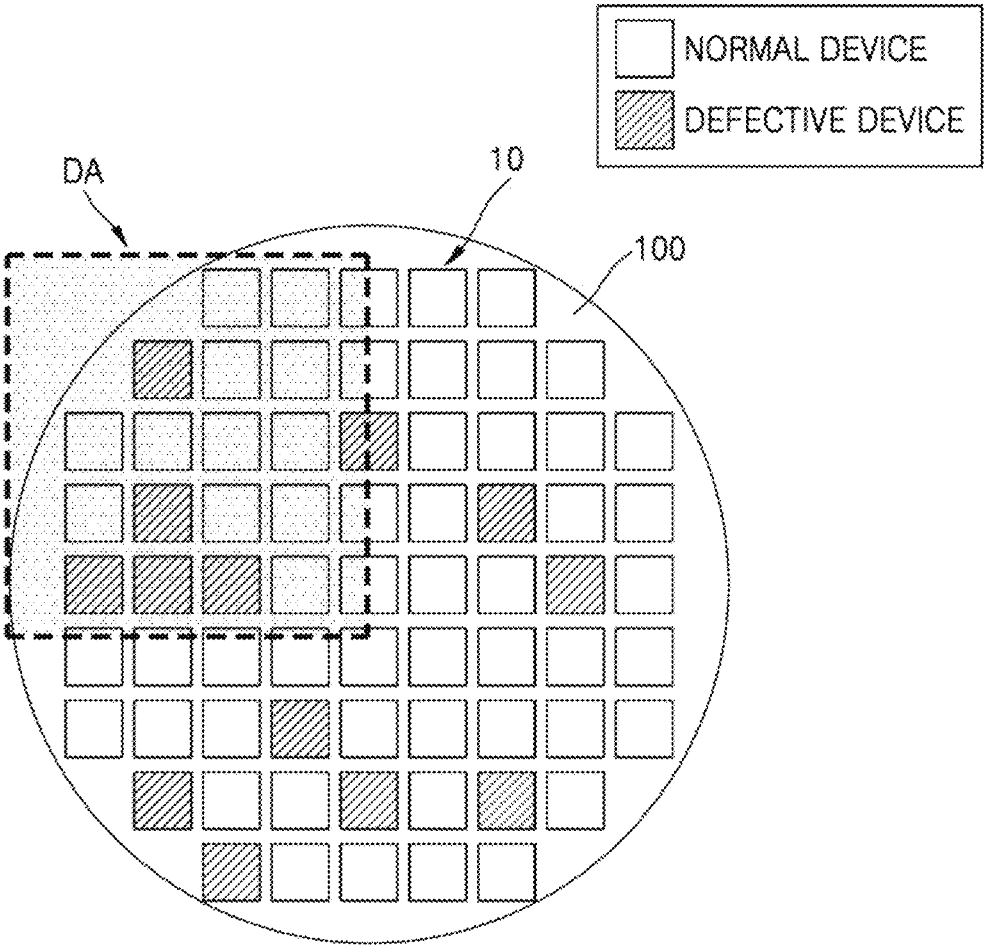
FIG. 8 is a plan view illustrating a device array to be analyzed in a device array analysis method, according to an embodiment.

FIG. 8 is a plan view illustrating a device array to be analyzed in a device array analysis method, according to an embodiment. The following description is given with reference to FIGS. 1 and 2 together.

Referring to FIG. 8, one or more devices 10 may be arranged on a substrate 100. In FIG. 8, one or more devices 10 inside a dashed line may be referred to as a device array DA. However, the number of one or more devices 10 included in the device array DA may variously vary, and the arrangement method of the one or more devices 10 included in the device array DA may also variously vary.

The detector U3 of FIG. 2 may obtain an image of the device array DA including the one or more devices 10. In addition, the analyzer U4 may determine whether each of the one or more devices 10 in the image obtained by the detector U3 is normal or defective. In the device array DA, some devices may be normal devices and some devices may be defective devices. As described in detail later, the analyzer U4 may determine whether the device array DA is normal or defective, based on the intensity of the second light signal emitted from the device array DA. That is, the analyzer U4 may determine whether each of the devices arranged in the device array DA is normal or defective.

Figure 11:
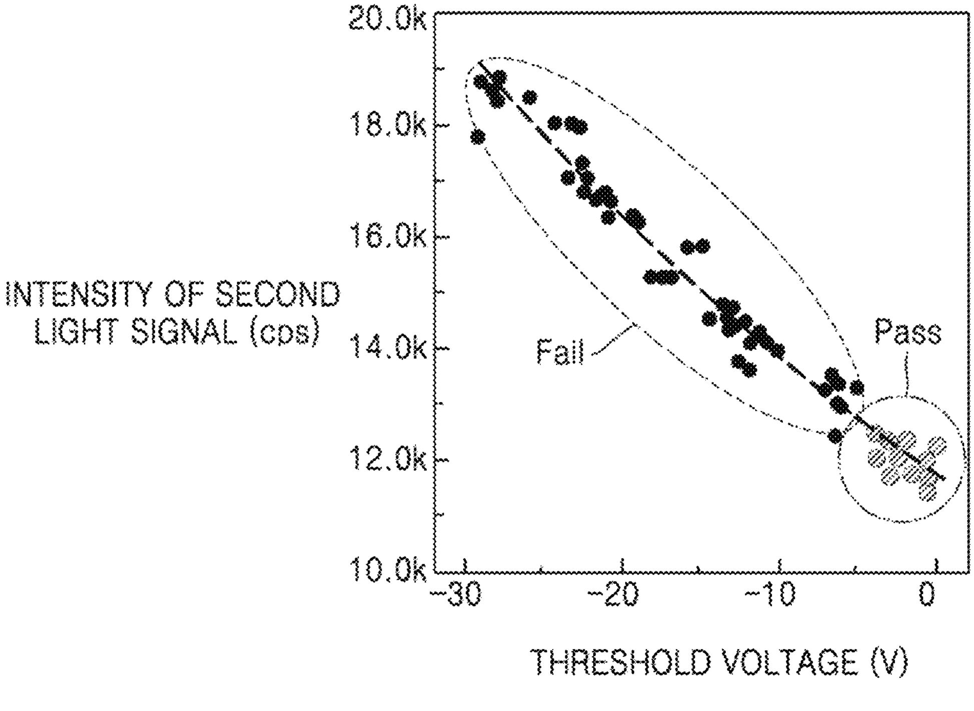
FIG. 11 is a graph showing intensity of a second light signal according to intensity of a threshold voltage, according to an embodiment.
Figure 12:
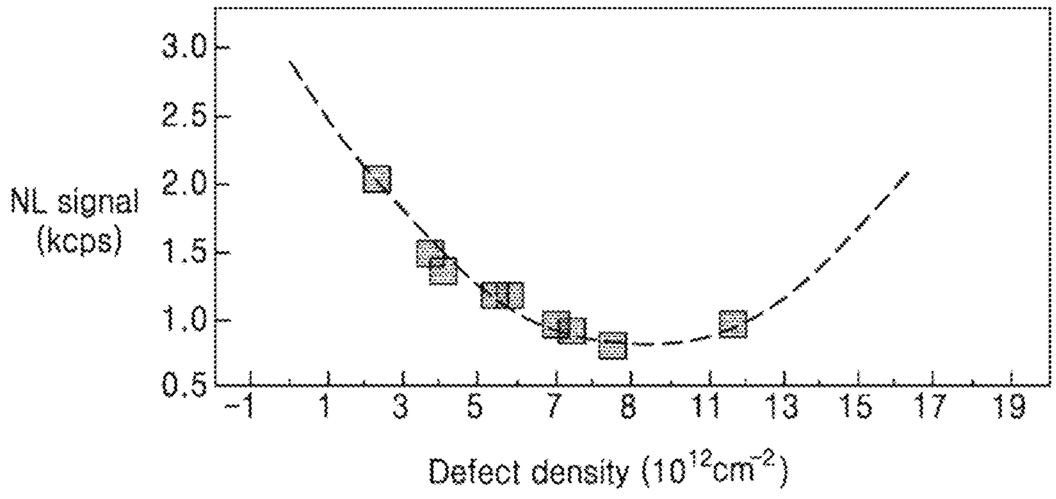
FIG. 12 is a graph showing a change in intensity of a non-linear (NL) signal according to a defect density, according to an embodiment.

FIG. 9 is a diagram illustrating threshold voltages in regions of a substrate, according to an embodiment, and FIG. 10 is a diagram illustrating intensity of a second light signal in regions of a substrate, according to an embodiment. FIG. 11 is a graph showing intensity of a second light signal according to intensity of a threshold voltage, according to an embodiment. FIG. 12 is a graph showing a change in intensity of a non-linear (NL) signal according to a defect density, according to an embodiment.

In FIG. 11, the horizontal axis represents the threshold voltage and the vertical axis represents the intensity of the second light signal. In FIG. 11, the unit of the horizontal axis is V that is the unit of voltage, and the unit of the vertical axis is count per second (cps). In FIG. 12, the horizontal axis represents the defect density and the vertical axis represents the intensity of the NL signal. In FIG. 12, the unit of the horizontal axis is $10^{12}$ $cm^{-2}$ that is the unit of density, and the unit of the vertical axis is kcps. In FIG. 11, normal devices are illustrated in a pass region and defective devices are illustrated in a fail region. The following description is given with reference to FIGS. 1 to 3 together.

Referring to FIGS. 9 to 12, the intensity of the second light signal may be obtained for each region on the substrate 100. In addition, the intensity of the threshold voltage of each of the devices 10 arranged in each region on the substrate 100 may be obtained. The threshold voltage of the device 10 in each region, which is obtained in FIG. 9, and the intensity of the second light signal of the device 10 in each region, which is obtained in FIG. 10, may be associated with each other. For example, as the threshold voltage increases, the intensity of the second light signal may decrease. In addition, as illustrated in FIG. 12, the defect density and the intensity of the NL signal may be associated with each other. The NL signal may include the second light signal.

Therefore, it is possible to determine whether the device 10 is normal or defective, based on the threshold voltage of the device 10, and it is possible to determine whether the device 10 is normal or defective, based on the intensity of the second light signal emitted from the device 10. That is, the analyzer U4 may determine whether the device 10 in each region is normal or defective, based on the intensity of the second light signal for each region on the substrate 100, which is obtained by the detector U3.

Figure 13:
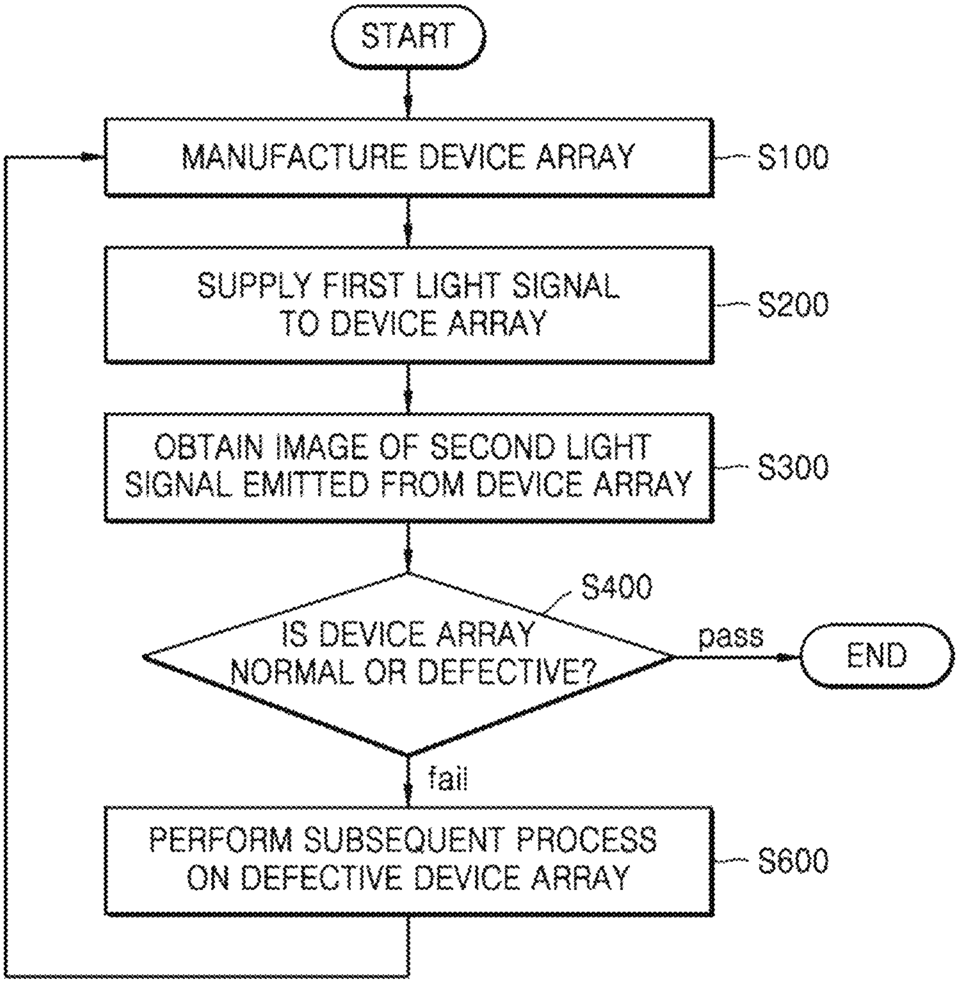
FIG. 13 is a flowchart of a device array analysis method according to an embodiment.

FIG. 13 is a flowchart of a device array analysis method according to an embodiment. The following description is given with reference to FIGS. 1 to 3 together.

Referring to FIG. 13, the device array analysis method of the disclosure may include manufacturing a device array (S100), supplying a first light signal to the device array (S200), obtaining an image by detecting a second light signal emitted from the device array (S300), and analyzing the image to determine whether each of one or more devices included in the device array is normal or defective (S400). Operations S100 to S400 of FIG. 13 may be substantially the same as operation S100 to S400 of FIG. 1, respectively.

The device analysis method of the disclosure may include performing a subsequent process on the device array when the device array includes defective devices (S600). The performing of the subsequent process on the defective device array (S600) may include finding the device array including defective devices requiring a subsequent process by moving a stage ST on which the device array is provided, and supplying a third light signal to the device array. In an embodiment, the third light signal may have a different path or source from that of the first light signal. In another embodiment, the third light signal may have the same path and source as those of the first light signal. In this case, the intensity and/or energy of the third light signal may be different from the intensity and/or energy of the first light signal.

Electrical characteristics of the device 10 included in the device array may be changed (i.e., improved) through the subsequent process. According to the device array analysis method described with reference to FIG. 1, electrical characteristics of a particular device 10 on the substrate 100 on which one or more devices 10 are arranged may be changed (i.e., improved). The performing of the subsequent process on the device array (S600) is described in detail with reference to FIG. 14.

After the performing of the subsequent process on the defective device array (S600), the process including the manufacturing of the device array (S100), the supplying of the first light signal to the device array (S200), the obtaining of the image by detecting the second light signal emitted from the device array (S300), and the analyzing of the image to determine whether each of the one or more devices included in the device array is normal or defective (S400) may be repeatedly performed. The process may be performed until the device array includes only normal devices.

Figure 14:
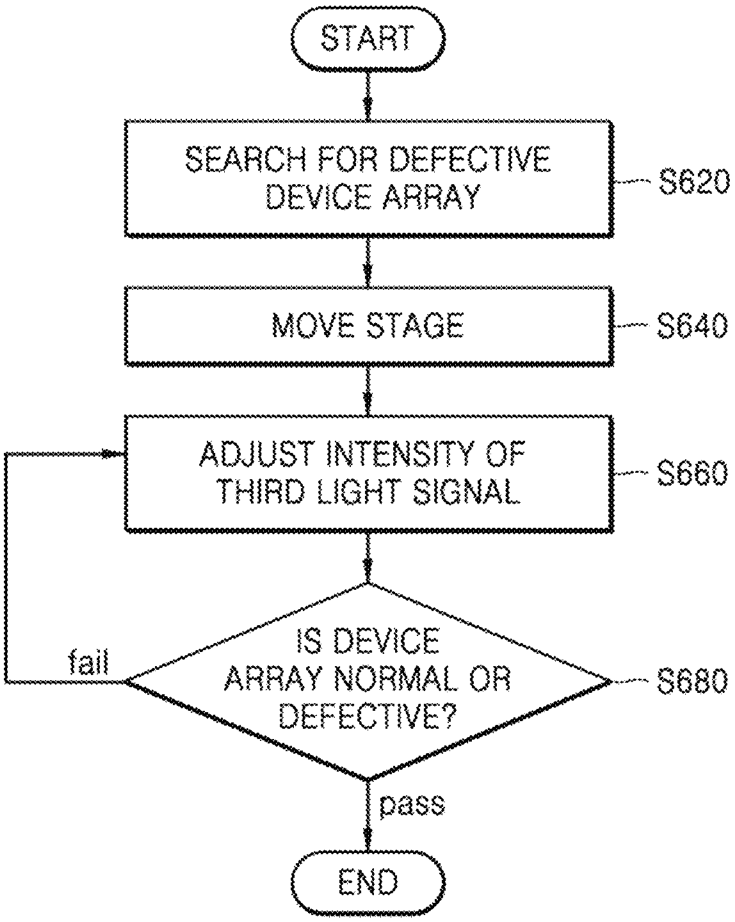
FIG. 14 is a flowchart of a method of performing a subsequent process on a device array, according to an embodiment.

FIG. 14 is a flowchart of the method of performing the subsequent process on the device array, according to an embodiment. The following description is given with reference to FIG. 13 together.

Referring to FIG. 14, the method of performing the subsequent process on the device array, according to the disclosure, includes searching for the defective device array (S620), moving the stage ST (S640), adjusting the intensity of the third light signal (S660), and determining whether the device array is normal or defective (S680).

As described above, the device array including defective devices may be classified as the defective device array. In contrast, the device array containing only normal devices may be classified as the normal device array. In order to perform the subsequent process on the defective device array classified in operation S620, the stage ST may be moved to control the third light signal to be incident on the defective device array. For example, the stage ST may be moved in the horizontal direction (the X direction and/or the Y direction) and/or the vertical direction (the Z direction) to control the third light signal to be incident on the defective device array.

Thereafter, the intensity of the third light signal may be adjusted based on the number of defective devices included in the defective device array, the defect rate of the defective device 10, and/or the defect density of the defective device array (S660). For example, the intensity of the third light signal may become stronger as the number of defective devices included in the defective device array increases, the defect rate of the defective devices increases, and/or the defect density of the defective device array increases. In contrast, the intensity of the third light signal may become weaker as the number of defective devices included in the defective device array decreases, the defect rate of the defective devices decreases, and/or the defect density of the defective device array decreases. The defect rate of the defective devices may be proportional to the difference between the designed threshold voltage value and the measured threshold voltage value of the defective device. That is, the intensity of the third light signal may be adjusted based on the threshold voltage of the defective device.

Thereafter, whether the device array is normal or defective may be determined (S680). Operation S680 may be substantially the same as the supplying of the first light signal to the device array of FIG. 1 (S200), the obtaining of the image by detecting the second light signal emitted from the device array (S300), and the analyzing of the image to determine whether each of the one or more devices included in the device array is normal or defective (S400). When the device array includes only normal devices (pass), the process may proceed to an end operation, and when the device array includes defective devices (fail), the process may proceed to operation S660.

Figure 15:
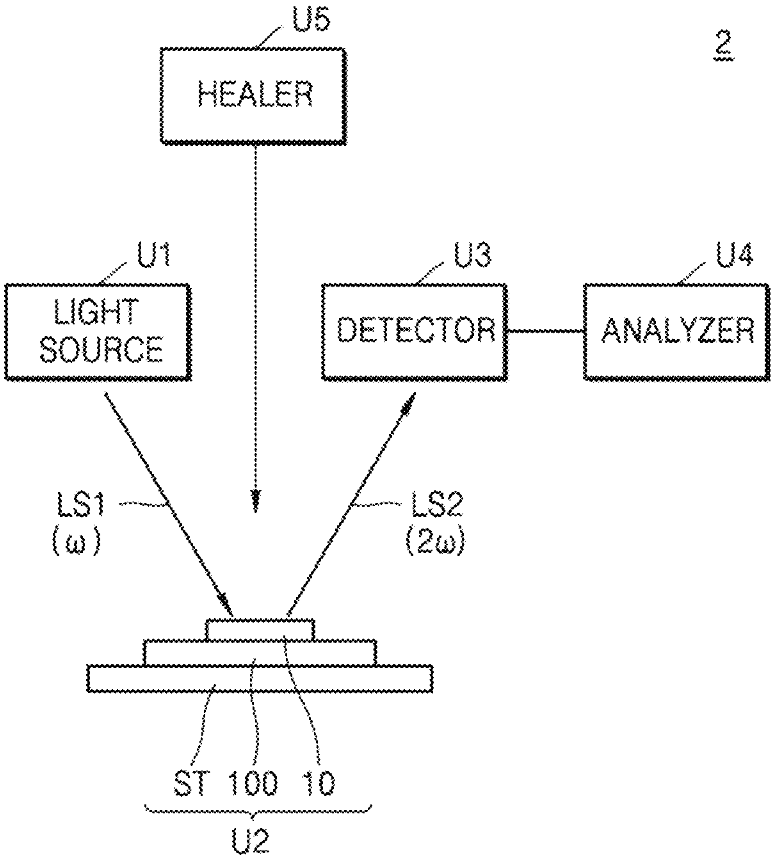
FIGS. 15 and 16 are schematic diagrams illustrating an analysis apparatus for device array analysis, according to an embodiment.
Figure 16:
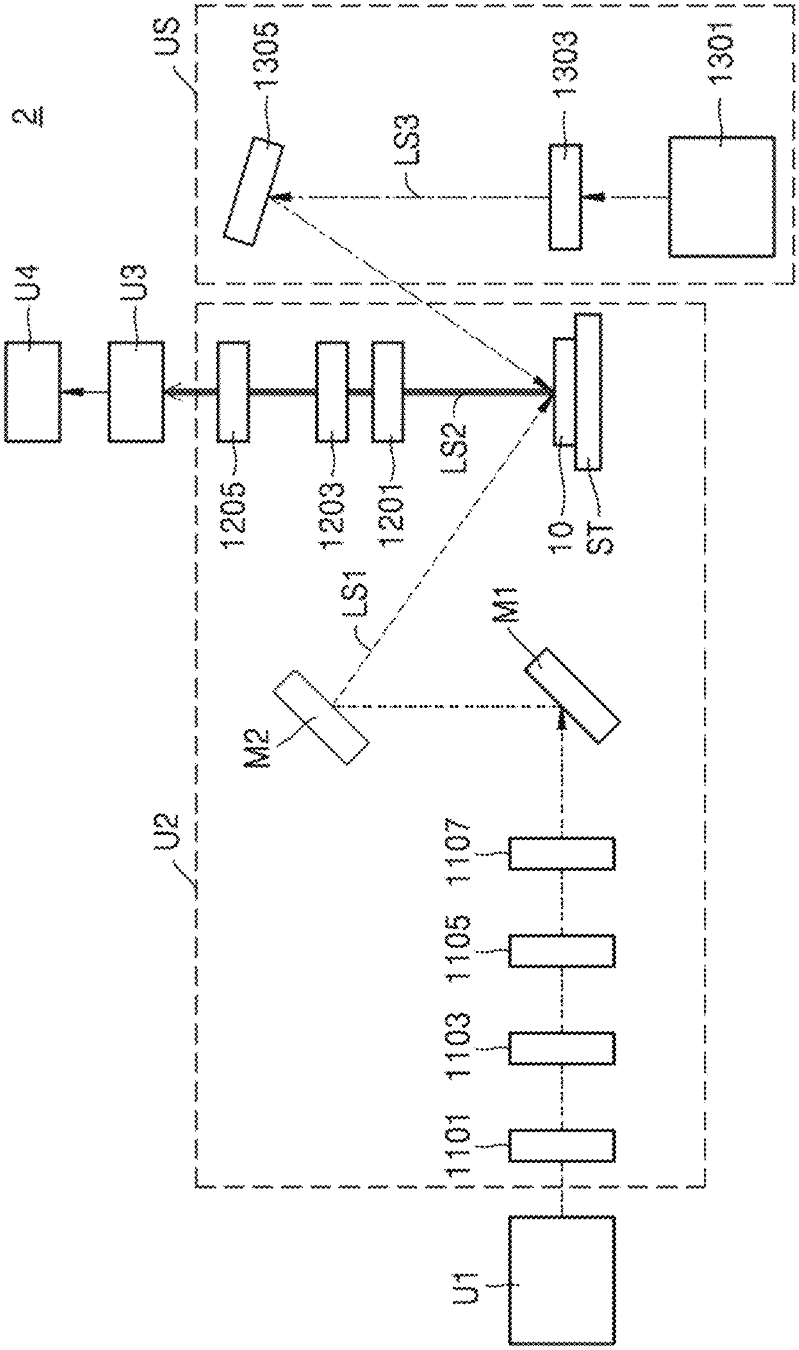

FIGS. 15 and 16 are schematic diagrams illustrating an analysis apparatus for device array analysis, according to an embodiment. The following description is given with reference to FIGS. 13 and 14 together.

Referring to FIGS. 15 and 16, an analysis apparatus 2 may include a light source U1, a sampler U2, a detector U3, an analyzer U4, and a healer U5. Since the light source U1, the sampler U2, the detector U3, and the analyzer U4 of the analysis apparatus 2 in FIG. 15 are substantially the same as the light source U1, the sampler U2, the detector U3, and the analyzer U4 of the analysis apparatus 1 in FIG. 3, the healer U5 is mainly described.

The healer U5 may be configured to heal the defective device and/or the defective device array. The healer U5 may change electrical characteristics of the defective device by irradiating the third light signal LS3 onto the defective device. In an embodiment, the healer U5 may be configured to irradiate the third light signal LS3 onto the device array including defective devices. In addition, the intensity of the third light signal LS3 may be controlled according to the number and/or degree of the defective devices included in the device array.

The healer U5 may include a healing light source 1301 and a second beam expander 1303. The healing light source 1301 may generate and emit light that is different from light generated and emitted by the light source U1. For example, the healing light source 1301 may generate and emit a third light signal LS3 that has ultraviolet and/or visible light wavelengths. However, the technical concept of the disclosure is not limited thereto, and any light may be used as long as the light heals the device 10. In addition, the second beam expander 1303 may adjust the diameter of the third light signal LS3. For example, the second beam expander 1303 may reduce and/or expand the diameter of the third light signal LS3.

In an embodiment, the healer U5 may be configured to make the third light signal LS3 be incident on the device array including the defective device 10. That is, the healer U5 may be configured to make the third light signal LS3 be incident on both the defective device 10 and the normal device 10. In this case, a process of aligning a path of the third light signal LS3 with the defective device 10 is omitted, and the defective device may be healed quickly and easily. In another embodiment, the healer U5 may be configured to make the third light signal LS3 be incident on the defective device 10.

The analysis apparatus 2 according to the disclosure may further include one or more mirrors 1305 and/or one or more lenses between the second beam expander 1303 and the stage ST. The one or more mirrors 1305 and/or the one or more lenses may adjust the angle of incidence at which the third light signal LS3 is incident on the sampler U2.

An example in which the healer U5 has a different configuration from that of the light source U1 is illustrated in FIGS. 15 and 16, but the technical concept of the disclosure is not limited thereto. For example, the healer U5 may be integrally formed with the light source U1.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A device array analysis method comprising:

manufacturing a device array including one or more devices;

supplying a first light signal to the device array;

obtaining an image by detecting a second light signal emitted from the device array;

analyzing the image to determine whether the device array is normal or defective; and modifying a manufacturing process condition of the device array in response to determining that the one or more devices include one or more defective devices.

2. The device array analysis method of claim 1, further comprising removing interference between different second light signals emitted from the device array.

3. The device array analysis method of claim 1, wherein the analyzing the image comprises:

calculating, based on an intensity of the second light signal, at least one of:

a threshold voltage of the one or more devices, or a defect density of the device array.

4. The device array analysis method of claim 1, wherein the obtaining the image comprises:

obtaining an image of the one or more devices, and/or obtaining an image of a device of the one or more devices, the device being located at a specific position in the device array.

5. The device array analysis method of claim 1, further comprising:

in response to determining that the device array includes only normal devices.

6. The device array analysis method of claim 1, wherein the obtaining of the image comprises:

executing an algorithm for combining spot spectra of the device array; and/or obtaining an image for each region in the device array.

7. The device array analysis method of claim 1, wherein a frequency of the second light signal is twice a frequency of the first light signal.

8. The device array analysis method of claim 1, wherein the one or more devices comprise at least one of a semiconductor device and a display device.

9. A device array analysis method comprising:

manufacturing a device array including one or more devices;

supplying a first light signal to the device array;

obtaining an image by detecting a second light signal emitted from the device array;

analyzing the image to determine whether the device array is normal or defective; and in response to determining that the device array is defective, performing a subsequent process on the defective device array, wherein the performing the subsequent process comprises:

supplying a third light signal to the defective device array; and determining whether the defective device array is normal or defective.

10. The device array analysis method of claim 9, wherein the performing the subsequent process comprises:

searching for the defective device array;

moving a stage configured to support the device array thereon;

adjusting an intensity of the third light signal supplied to the defective device array.

11. The device array analysis method of claim 10, wherein the adjusting the intensity of the third light signal is performed based on at least one of:

a number of defective devices of the one or more devices included in the defective device array, a threshold voltage of a defective device of the one or more devices, and a defect density of the defective device array.

12. The device array analysis method of claim 10, further comprising:

in response to determining that the defective device array includes only normal devices, proceeding to an end operation; and in response to determining that the one or more devices of the defective device array include a defective device, proceeding to the adjusting of the intensity of the third light signal.

13. The device array analysis method of claim 10, wherein the third light signal is incident on a normal device and/or a defective device of the one or more devices.

14. The device array analysis method of claim 10, wherein the third light signal is incident on a defective device of the one or more devices.

15. A device array analysis apparatus comprising:

a light source configured to generate and emit a first light signal;

a sampler configured to receive the first light signal and emit a second light signal;

a detector configured to detect and image the second light signal to form an image; and an analyzer configured to analyze the image, wherein the image includes information about the second light signal emitted from a device array including one or more devices, and wherein the device array analysis apparatus further comprises:

another light source configured to generate and emit a third light signal incident on the device array.

16. The device array analysis apparatus of claim 15, further comprising a beam shaper configured to shape the first light signal to have a constant intensity according to space.

17. The device array analysis apparatus of claim 15, further comprising a first beam expander configured to adjust a diameter of the first light signal.

18. The device array analysis apparatus of claim 15, wherein the another light source comprises a healer, and wherein the third light signal is configured to heal a defective device of the one or more devices of the device array.

19. The device array analysis apparatus of claim 18, further comprising a second beam expander configured to adjust a diameter of the third light signal.

20. The device array analysis apparatus of claim 15, further comprising an interference remover configured to remove interference between different second light signals emitted from the device array.

* * * * *